J. B. WISMER.
NUT LOCK.
APPLICATION FILED MAR. 3, 1910.
972,968.
Patented Oct. 18, 1910.
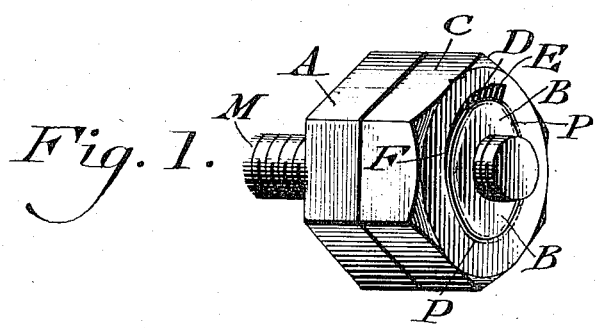
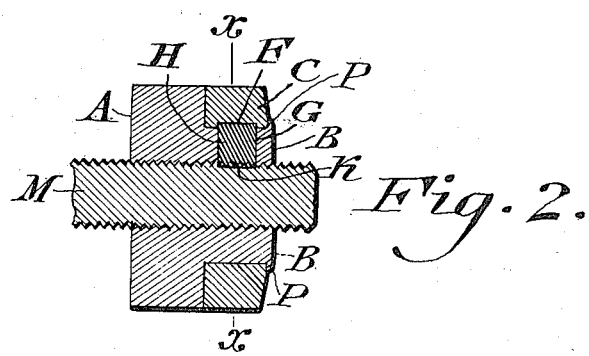
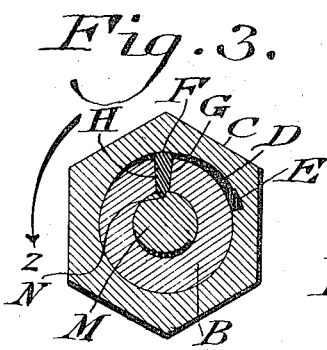
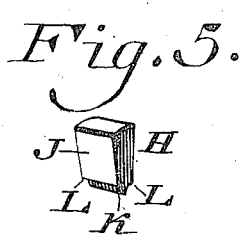
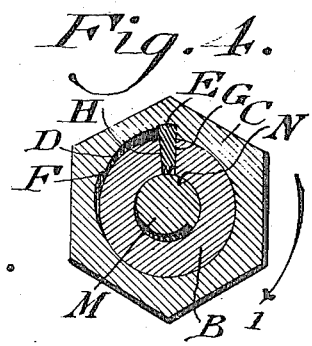
WITNESSES
INVENTOR
Joseph B. Wismer.
BY Wiedersheim & Fairbanks
ATTORNEYS

UNITED STATES PATENT OFFICE.

JOSEPH B. WISMER, OF FRANCONIA, PENNSYLVANIA.

NUT-LOCK.

972,968.  Specification of Letters Patent.  Patented Oct. 18, 1910.

Application filed March 3, 1910. Serial No. 547,016.

*To all whom it may concern:*

Be it known that I, JOSEPH B. WISMER, a citizen of the United States, residing at Franconia, county of Montgomery, State of Pennsylvania, have invented a new and useful Nut-Lock, of which the following is a specification.

My invention consists of a nut fastener or lock embodying a nut provided with a detent, a sleeve adapted to force said detent into engagement with the threads of a bolt to be secured, and means for releasing said detent from said threads by the rotation of the nut or bolt when superior force is applied to either, the construction of parts being hereinafter described and the novel features pointed out in the claims.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a nut lock embodying my invention. Fig. 2 represents a longitudinal section thereof. Figs. 3 and 4 represent sections on line $x$—$x$ Fig. 2, certain portions being in different positions in the two figures. Fig. 5 represents a perspective view of the detent employed.

Similar letters of reference indicate corresponding parts in the figures.

Referring to the drawings:—A designates a nut which is formed with the reduced neck B which extends in the longitudinal direction of the body of the nut and projects from the outer side thereof. On said neck is freely fitted the sleeve C, a part of the wall of whose bore being elliptical producing a cam groove which is deepened at one end forming the cavity or recess E and intermediate of its ends forming the cavity or recess F whose wall comprises a shoulder with which the head of the detent may engage as will be hereinafter more particularly referred to. In said neck is a radial passage G, in which is fitted the movable detent H, which consists of the tapering body J, the point K and the shoulders L at the place of junction of said point with said body, it being noticed that said point which comprises the tooth proper of the detent is elongated and when in position extends parallel with the bolt M on which the nut A and its neck B are screwed.

The operation is as follows:—In the normal condition of the device, the detent H has its head occupying the recess E, and its front removed from the thread of the bolt, the body of the detent remaining in such position owing to its frictional contact with the walls of the passage G. The nut A is screwed to the bolt, to the full or required extent, and the sleeve rotated in the present case to the right as per arrow 1 whereby the elliptical wall D of the same rides over the head of the detent H, and owing to the narrowing nature of the recess formed by said wall, the detent is moved in the passage G to and toward the bolt and its tooth K forced against the threads of the latter so as to crush or cut into the same producing a depression N in said threads in the longitudinal direction of the bolt, while the head of the detent occupies the cavity F engaged by the shoulder thereof, the parts being in position as in Fig. 3, thus interlocking the bolt with the detent and consequently interlocking the nut and sleeve with the bolt, preventing the unlocking rotation of either member. In this position the shoulders L of the detent rest on the uncut portions of the threads of the bolt at the sides of the depression N. When the bolt and nut are to be disconnected, the sleeve will be rotated by superior pressure in the reverse direction or that indicated by the arrow 2 when owing to the widening nature of the recess formed by the elliptical wall D, the head of the detent is gradually relieved of the pressure of said wall. Then the nut or bolt is rotated whereby as the threads of the latter contact with the shoulders L of the detent said shoulders are subjected to the action of the threads of the bolt, whereby the detent is lifted and the tooth K removed from the depression N, the head of the detent then entering the cavity E, while its tooth is no longer in the path of the threads of the bolt permitting the nut to be unscrewed from the bolt or vice-versa. On the outer end of the neck B is the shoulder P which extends radially therefrom so as to embrace freely the outer side of the sleeve C about the bore thereof, thus serving to retain the sleeve on the nut without interfering with its rotation on the neck thereof.

Having thus described my invention what I claim as new and desire to secure by Letters Patent, is:—

1. In a nut lock, a nut having a neck portion, a sleeve rotatable thereon, and a detent in said neck portion, said sleeve having a bore with a cam groove which is provided with a recess at one end and an intermediate shoulder.

2. In a nut lock, a nut having a neck portion, a sleeve rotatable thereon, and a detent in said neck portion, said sleeve having a bore with a cam groove which is provided with a recess at one end and an intermediate shoulder, said detent extending radially of the bore of the nut with its outer end constructed to engage either said recess or shoulder.

3. In a nut lock, a nut having a neck portion, a sleeve rotatable thereon, and a radially-extended detent in said neck portion, said detent being confined between the sleeve and nut both radially and lengthwise of the bore of the nut, said sleeve having a bore with an enlarged portion with a shoulder to be engaged by the outer ends of said detent in radial alinement with its inner end.

4. In a nut lock, a nut, a detent therein disposed radially of the nut, a rotatable sleeve on a member of the nut, said sleeve having a bore partly elliptical with an intermediate shoulder, the elliptical portion being adapted to ride on said detent in one direction of rotation of the sleeve and force it endwise into engagement with a bolt on which said nut is fitted and ride on said detent in the other direction of rotation of the sleeve and relieve said detent of the pressure of said portion, said detent having a point which is adapted to pierce the thread of said bolt, and a shoulder set back from said part adapted to rest upon said thread at the side of the place of occupation of said point.

5. In a nut lock, a nut having a neck portion, a sleeve rotatable thereon, said neck portion having at its outer end a radially extending shoulder to freely embrace the outer face of the sleeve, and a detent in said neck portion, said sleeve having a cam groove, which is provided with a recess at one end and an intermediate shoulder.

JOSEPH B. WISMER.

Witnesses:
B. D. ALDERFER,
MERMO D. WISMER.